(12) United States Patent
Murphy

(10) Patent No.: US 9,149,020 B1
(45) Date of Patent: Oct. 6, 2015

(54) SELF-REGULATED LIQUID DISPENSER AND SYSTEM FOR MAINTAINING A LIQUID LEVEL IN A CONTAINER OF DISPENSED LIQUID

(71) Applicant: Roderick John Murphy, Columbia, MD (US)

(72) Inventor: Roderick John Murphy, Columbia, MD (US)

( * ) Notice: Subject to any disclaimer, the term of this patent is extended or adjusted under 35 U.S.C. 154(b) by 162 days.

(21) Appl. No.: 13/734,412

(22) Filed: Jan. 4, 2013

Related U.S. Application Data

(63) Continuation of application No. 12/696,218, filed on Jan. 29, 2010, now Pat. No. 8,347,821.

(51) Int. Cl.
*A01K 29/00* (2006.01)
*A01K 13/00* (2006.01)

(52) U.S. Cl.
CPC .................................... *A01K 13/001* (2013.01)

(58) Field of Classification Search
CPC .... A01K 13/00; A01K 13/001; A01K 13/003
USPC ......... 119/600, 602, 603, 604, 606, 650, 652, 119/656–660, 662, 665–668, 651
See application file for complete search history.

(56) References Cited

U.S. PATENT DOCUMENTS

| | | | | |
|---|---|---|---|---|
| 5,138,980 | A * | 8/1992 | Ewing | 119/73 |
| 5,353,957 | A * | 10/1994 | Campau | 222/1 |
| 5,975,161 | A * | 11/1999 | Ridgley | 141/231 |
| 7,661,393 | B2 * | 2/2010 | Torgerson et al. | 119/669 |
| 2007/0074672 | A1 * | 4/2007 | Torgerson et al. | 119/667 |

* cited by examiner

*Primary Examiner* — David Parsley
*Assistant Examiner* — Thien Thanh Pham
(74) *Attorney, Agent, or Firm* — Garcia-Zamor IP Law; Ruy M. Garcia-Zamor

(57) ABSTRACT

A self regulated feeder for a footbath for animals may include a hollow container for a source of fluid, an outlet passageway to connect the hollow container with the footbath, an air return passageway to connect the hollow container to ambient air to return air to the hollow container, and a differential valve to restrict the returning air to the hollow container. The fluid may include air, and the fluid may include a liquid having a disinfect agent. The self regulated feeder may include a flush passageway to flush the footbath, and the air return passageway may be connected to a liquid trap container to prevent fluid from the footbath from reaching the hollow container.

23 Claims, 3 Drawing Sheets

SELF-REGULATED LIQUID DISPENSER AND SYSTEM FOR MAINTAINING A LIQUID LEVEL IN A CONTAINER OF DISPENSED LIQUID

PRIORITY

The present invention claims priority under 35 USC section 119 and based upon a provisional application with a Ser. No. 61/230,818 which was filed on Aug. 3, 2009 and another provisional application with a Ser. No. 61/148,356 which was filed on Jan. 29, 2009.

FIELD OF THE INVENTION

The present invention relates to a foot bath for animals, such as dairy cows and more particularly to an automated device for dispensing liquid solution into such footbath so as to maintain the physical depth of the liquid at a predetermined level and so as to maintain the potency of the solution at the predetermined level regardless of the soiling of the bath by animals from waste generated by the animals as the animals pass through the bath by compensating for the amount of liquid removed from the bath by these animals.

BACKGROUND ART

In a dairy parlor it is common to have the cows exiting the dairy parlor walk through a foot bath of various sizes. This foot bath would have disinfectant, medication, or other chemical that is dissolved in water. The common prior art procedure is that there would be the area having a small pool which contains the water. The dairyman uses a hose to fill the pool with the water, and then pours the disinfectant chemical liquid and/or powder into the water and mixes these in the pool manually.

Also, there are automatically operated devices that replicate these actions i.e. clean out the bath by flushing with water to completely empty the bath, add water, add chemical.

During the course of the cows moving through the foot bath, a certain amount of manure will commonly collect in the foot bath. After a certain number of cows have passed through the footbath, then the dairyman will empty the footbath.

U.S. Pat. No. 5,774,909 (Stable) discloses a foot bath for the use in the treatment of cattle and other livestock. There is a resilient pad which is covered with a shallow layer of disinfectant fluid. As the cow steps on the pad, the fluid flows around the foot.

U.S. Pat. No. 5,630,379 (Gerk et al.) discloses what is called an "electrically controlled spraying device for cleaning and treating animals". There are rails around an enclosure and discharge nozzles mounted to spray a cleaning fluid or a treatment fluid under the animal, and it states that the device is able to clean the hooves of the animal.

U.S. Pat. No. 5,224,224 (Hintz et al.) discloses a foot bathing fixture that includes a seat supported on a raised pedestal. This is incorporated into a shower enclosure for a person.

U.S. Pat. No. 4,979,536 (Midkiff) discloses a portable a truck tire washing apparatus. There are two longitudinally-spaced tire rotating driveable roller trailer assemblies mounted on a support member and a liquid spraying means for spraying the tires.

U.S. Pat. No. 4,228,554 (Tumminaro) shows a toilet for animals particularly adapted for pets such as dogs and cats. There is a user platform on which the animal stands, and the platform has an upper surface which is gradually inclined down on shallow angle toward a center opening of the toilet. A flushing liquid is provided to flow over the surface to clean the waste material from the upper surface, and a bowl is located beneath the upper platform to receive the waste.

U.S. Pat. No. 2,989,965 (Rod) discloses a "foot wear decontaminating apparatus" for use in the atomic industry. The user steps on a platform immersed in a fluid, and a high frequency agitator washes off the contaminating material.

U.S. Pat. No. 2,956,565 (Anderson) discloses therapeutic equipment for remedial bathing and massaging treatment of feet and legs of animals. There is a container filled with granular solids such as soft, clean sand possibly 104 inches long, 42 inches wide and 18 inches high to contain the granular material. The racing horse, for example, is brought to stand with all feet in the soft wet bed and is permitted to sink to a depth somewhere between the ankle and knee height. Heat that could be applied to alleviate the soreness of the animal.

U.S. Pat. No. 853,533 (Byrd) shows a foot bath intended to be occupied by horses as they drink from the attached water trough. There is a drain to keep the water at the desired depth.

A disadvantage of other manual and automatic systems is that these systems are based on a batch-made approach in which a bath is made, is allowed to deteriorate at an increasing rate, and is replaced after a designated time or number of animals with fresh solution.

SUMMARY

A self regulated feeder for a footbath for animals may include a hollow container for a source of fluid, an outlet passageway to connect the hollow container with the footbath, an air return passageway to connect the hollow container to ambient air to return air to the hollow container, and a differential valve to restrict the returning air to the hollow container.

The fluid may include air, and the fluid may include a liquid having a disinfecting or other agent.

The self regulated feeder may include a flush passageway to flush the footbath or other components of the system, and the air return passageway may be connected to a liquid trap container to prevent fluid from the footbath from reaching the hollow container.

The liquid trap container may be connected to a liquid trap passageway, and the liquid trap passageway may extend into the footbath a second distance and the outlet passageway extends into the footbath a first distance.

The second distance may be less than the first distance, and the differential valve may include a first flow rate in a first direction and a second flow rate in a second direction.

The first flow rate may be faster than the second flow rate, and the hollow container may include a input passageway.

The input passageway may include a shutoff valve, and the outlet passageway may include a shutoff valve.

The fluid passageway may include a shutoff valve, and the foot bath may receive fluid from the hollow container periodically in response to the a lower level of the liquid of the footbath.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

The present invention includes a self-regulated dispenser of liquid including a reservoir tank of a volumetric capacity matched to the requirements of the foot bath as they relate to the size of the bath and to the number of animals passing through the bath and to the number of times it is desired for the animals to pass through before refilling the reservoir.

The self-regulated dispenser may include the capability of stopping flow at or near the time when the desired physical level is attained in the foot bath so as to minimize liquid wastage and may include a facility such as a line flush capability for ensuring that there is no excessive buildup of fouling material in pipes or passageways of the system that may prevent it from functioning in the desired manner.

The self-regulated dispenser may include a component or components that prevent outside material from entering the reservoir of stored liquid.

The self-regulated dispenser may be fitted with a special valve to allow rapid expulsion of air in the reservoir for rapid filling but only allow very slow return of air as the reservoir empties over time.

The system may be fitted with shut-off valves and a gauge such as, for example, a sight gauge, for determining stored liquid level in the reservoir.

Figure 1:
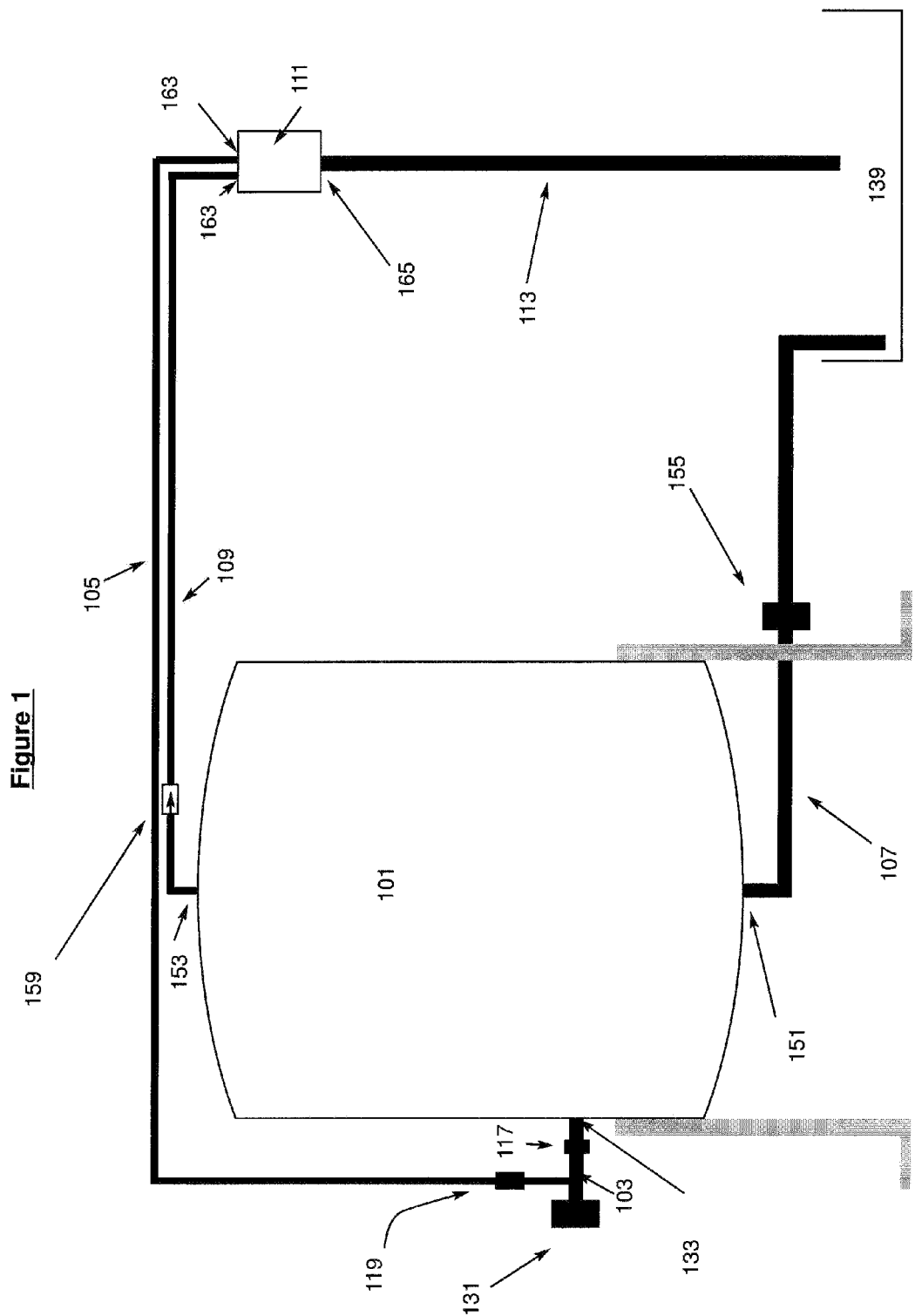
FIG. 1 illustrates a self regulated liquid feeder of the present invention.

FIG. 1 illustrates the self regulated liquid feeder 100 which may include a hollow container 101 which may include a fluid which may be air and/or a liquid, which may be water or which may be water mixed with a disinfectant or other material which is desirable to apply to the feet of animals. The hollow container 101 may include an inlet 133 to allow the fluid to enter the hollow container 101, and the inlet 133 may be connected to an input passageway 103 to connect to a source of fluid. The input passageway 103 may include a first shutoff valve 117 to control the flow of the fluid into the hollow container 101 and the input passageway 103 may be connected to a flush passageway 105 which may be connected to a liquid trap container 111 which may be hollow to flush the air return line 113 with the fluid. The flush passageway 105 may include a second shutoff valve 119 to control the flow of the fluid through the flush passageway 105. The flow of the fluid into the input passageway 103 and the flush passageway 105 is controlled by the third shutoff valve 131. The hollow container 101 may include a first outlet 151 at substantially the bottom of the hollow container 101 to drain the liquid from the hollow container 101 and to input the liquid into the open container 139. The first outlet 151 may be connected to an outlet passageway 107 which may extend to the interior of the open container which may be a foot bath for animals such as cattle, dairy cows or other types of animals and may extend into the interior of the open container 139 at a distance 'a' from target surface of the liquid filled into the open container 139. The outlet passageway 107 may include a fourth shutoff valve 155 to control the flow of the liquid within the outlet passageway 107. The hollow container 101 may be mounted on feet 157 or otherwise held above the floor, ground, or other surface.

The hollow container 101 may include a second outlet 153 which may be substantially at the top of the hollow container 101 and which may be connected to the air return passageway 109 which may be connected to the liquid trap passageway 113. The air return passageway 109 may allow air to escape the hollow container 101 as the hollow container 101 is being filled with fluid. The air return passageway 109 may include a differential valve 159 to control the air that flows within the air return passageway 109. The differential valve 159 provides a first flow (rate) in the direction of the liquid trap container 111 and provides a second flow (rate) in the direction of the hollow container 101. The first flow rate may be substantially greater than the second flow rate to provide for rapid air release when the hollow container 101 is being filled with fluid so that air can flow rapidly out of the hollow container 101 to the liquid trap container 111. The slower second flow rate of the differential valve 159 restricts the flow of fluid especially air into the hollow container 101 in order to prevent excessive air from causing the fluid level within the hollow container 101 to fall too rapidly.

The liquid trap container 111 may include a first inlet 161 to connect to the air return passageway 109 and may include a second inlet 163 to connect to the flush passageway 105. The liquid trap container 111 may include an outlet 165 to connect to the liquid trap passageway 113 which may extend into the interior of the open container 139 and may extend to the surface of the liquid in the open container.

In operation, to flush the liquid trap 111 and the liquid trap passageway 113, the first shutoff valve 117 may be closed or partly closed and the second shutoff valve 119 may be open to allow fluid to flow within the flush passageway 105 and to the liquid trap container 111 and to the liquid trap passageway 113 and into the open container 139. The fluid flows from the liquid trap container 111 through the liquid trap passageway 113 and into the open container 139 until the liquid trap and the liquid trap passageway have reached a desired state of cleanness.

In order to fill the hollow container 111 with fluid, the second shutoff valve 119 may be closed and the first shutoff valve 117 may be opened and the fourth shutoff valve 155 may be closed. Fluid enters the hollow container 101 and forces the air towards the top of the hollow container 101. The differential valve 159 allows the air to flow through the air return passageway 109 at a second rate through the liquid trap container 111, through the liquid trap passageway 113 to the ambient atmosphere at the second flow rate.

Typically, the hollow container 101 is filled with fluid, and the fourth shutoff valve 155 may be opened in order to allow fluid to flow from the hollow container 101 through the outlet passageway 107 to the open container 139. As the fluid is withdrawn from the hollow container 101, the level of fluid rises in the open container 139 and air is drawn into the closed container 101 through the passageways 113 and 109 by the negative pressure developed in the closed container 101. When the level of liquid in the open container rises to the open end of passageway 113 the flow of air through the passageway 113, and the liquid trap, and the passageway 109, into the open container 101 is blocked by the liquid in the open container 139. A partial vacuum is then produced at the top of the hollow container 101 as a result of the weight of the column of liquid between the surface of the liquid in the open container 139 and the surface of the liquid in the closed container 101. This partial vacuum continues to increase and draws the liquid in the open container upwards through the passageway 113 until the surface of the drawn liquid in passageway 113 is at the same level horizontally as the level of liquid in the closed container 101. The negative pressure exerted by the column of liquid in the passageway 113 is then the same as the negative pressure exerted by the column of liquid in the closed container 101 and all liquid and air movement stops. The system remains stable at this level until the passage of animals through the open container 139, or some other cause, reduces the level of liquid in the open container 139 so that the end of passageway 113 is again exposed to the air. The air will then bubble upwards through the passageway 113 causing a reduction in the vacuum in the closed space between the surfaces of the liquid in the closed container 101 and the passageway 113. This will result in the release of liquid through passageway 107 into the open container 139 raising the level in open container 139 so that passageway 113 is again closed and fluid movement stops. The level of fluid in 139 is therefore regulated substantially at whatever level the open end of passageway 113 is set.

When the open end of passageway 113 is exposed to air by the falling liquid in container 139 the partial vacuum in the system would cause very rapid induction of air and would result in too much vacuum release if the air flow were not restricted by the differential valve 159.

As the animals, for example dairy cows, enter, traverse and leave the open container 139, fluid within the open container 139 may be contaminated with waste and may be removed from the open container 139 as result of the animal splashing. Since the end of the outlet passageway 107 extends further into the interior of the open container 139 than the end of the liquid trap passageway 113 the end of the liquid trap passageway 113 will be exposed to the ambient air before the end of the outlet passageway 107 is exposed to the ambient air. When the end of the liquid trap passageway and air return line 113 is exposed to the ambient air, the differential valve 159 allows the air from the liquid trap passageway and air return line 113 to enter the hollow container 101 at a controlled first rate and the vacuum within the hollow container 101 is reduced which will allow liquid from the hollow container 101 to flow through the outlet passageway 107 to the open container 139. Since the air may be able to flow at a faster rate than the liquid can be dispensed to the open container 139, the differential valve 159 controls the flow of air at a second rate in order to prevent the elimination or the excessive reduction of the vacuum in the hollow container 101 which could allow an excess of liquid to flow into the open container 139.

The liquid trap container 111 prevents any contaminated liquid from the open container 139 from inadvertently entering the hollow container 101 through the second outlet 153.

As a consequence, the liquid within the open container 139 is being periodically refreshed in response to the dropping fluid level within the open container 139 as the animals expel the liquid from the open container 139. If the liquid within the hollow container 101 includes active ingredients which may include hoof treatment agents, these agents are periodically added to the open container 139 in response to the dropping fluid level which may increase the effectiveness of the open container 139 being used as a foot bath for animals. This can maintain the level of the treatment agents at a substantially high level, eliminating the need to drain the liquid from the open container 139 in order to refresh the treatment agents.

Figure 2:
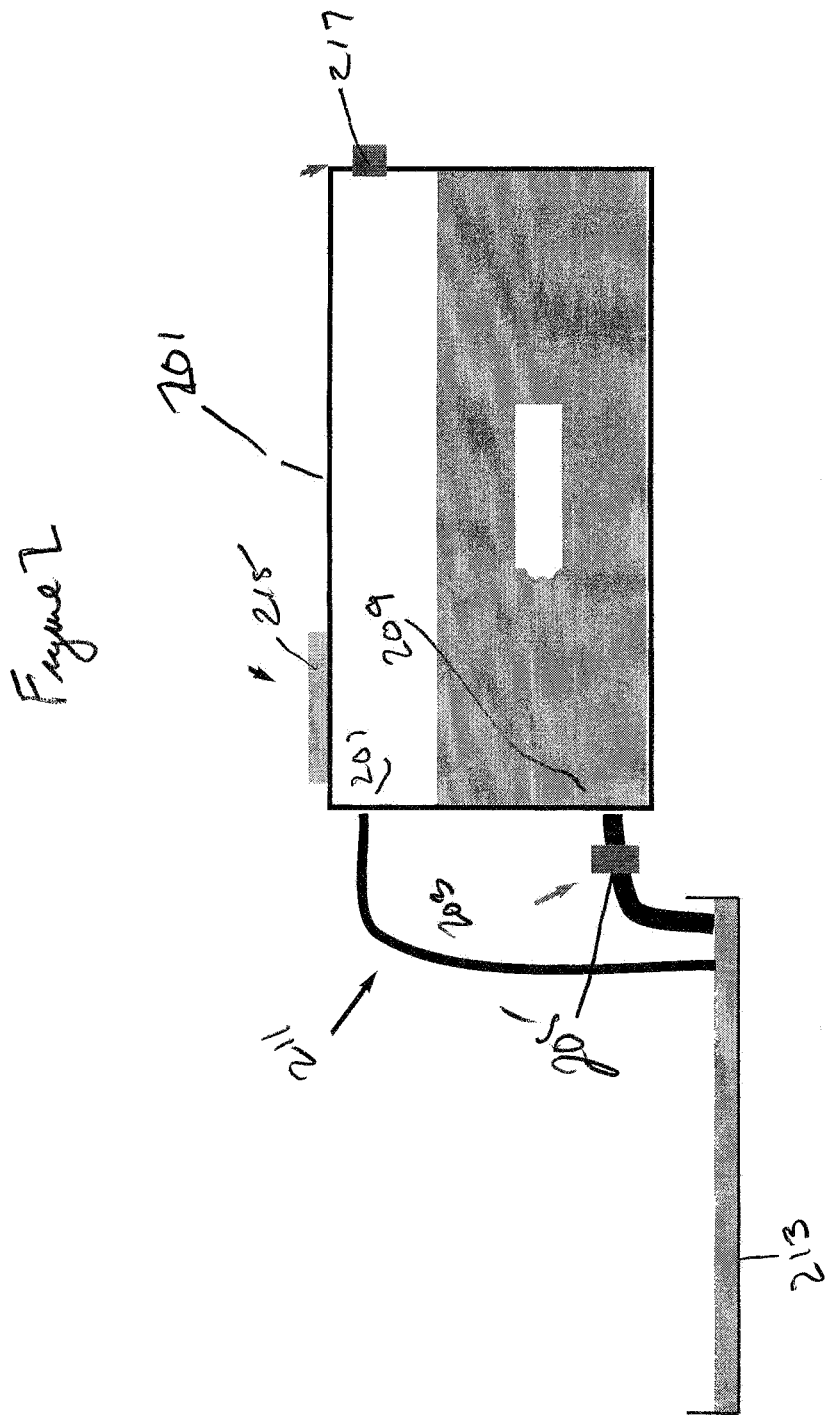
FIG. 2 illustrates another self regulated liquid feeder of the present invention.

FIG. 2 illustrates another liquid feeder for washing the feet of animals for example dairy cows, and the liquid feeder may include a hollow container 201 which may be filled with a fluid such as air or liquid which may include treatment agents. The hollow container 202 may include an inlet 207 which may be connected to an air passageway 211 to allow air to be transmitted from the ambient atmosphere to the interior of the hollow container 202 when the fluid level of the open container 213 (a foot bed for animals) drops below the end of the air passageway 211 which may be positioned within the interior of the open container 213. The hollow container 202 may also include an outlet 209 which may be connected to a discharge passageway 203 to conduct fluid within the hollow container 202 to the open container 213. The discharge passageway 203 may include a shutoff valve 205 to shut off the flow of fluid through the discharge passageway 203. The hollow container 201 may include a fill port 205 to fill the hollow container 201 with fluid and may include a filter 207 to filter the air within the hollow container 201.

In operation, as the dairy cows enter the open container 213, the cows lower the liquid level by splashing the liquid out of the open container 213. The cows deposit waste within the open container 213 which lowers the treatment agent concentration. When the surface of the liquid drops below the end of the air passageway 211 positioned within the interior of the open container 213, air flows through the hollow container 211 and the air allows the liquid to flow in response to the lower liquid level of the open container 213 through the discharge passageway 213 and to enter the open container 213. The additional liquid from the hollow container 201 increases the level of the treatment agent and stops the airflow through the hollow container 201 as the liquid level rises above the end of the air passageway 211.

A method and apparatus of dispensing liquid into a footbath for animals at a rate approximately equal to the rate at which liquid is removed by the animals in small increments such that the physical level of liquid in the bath does not change dramatically so that all animals passing through the bath have their feet covered by liquid at a substantially constant depth.

Figure 3:
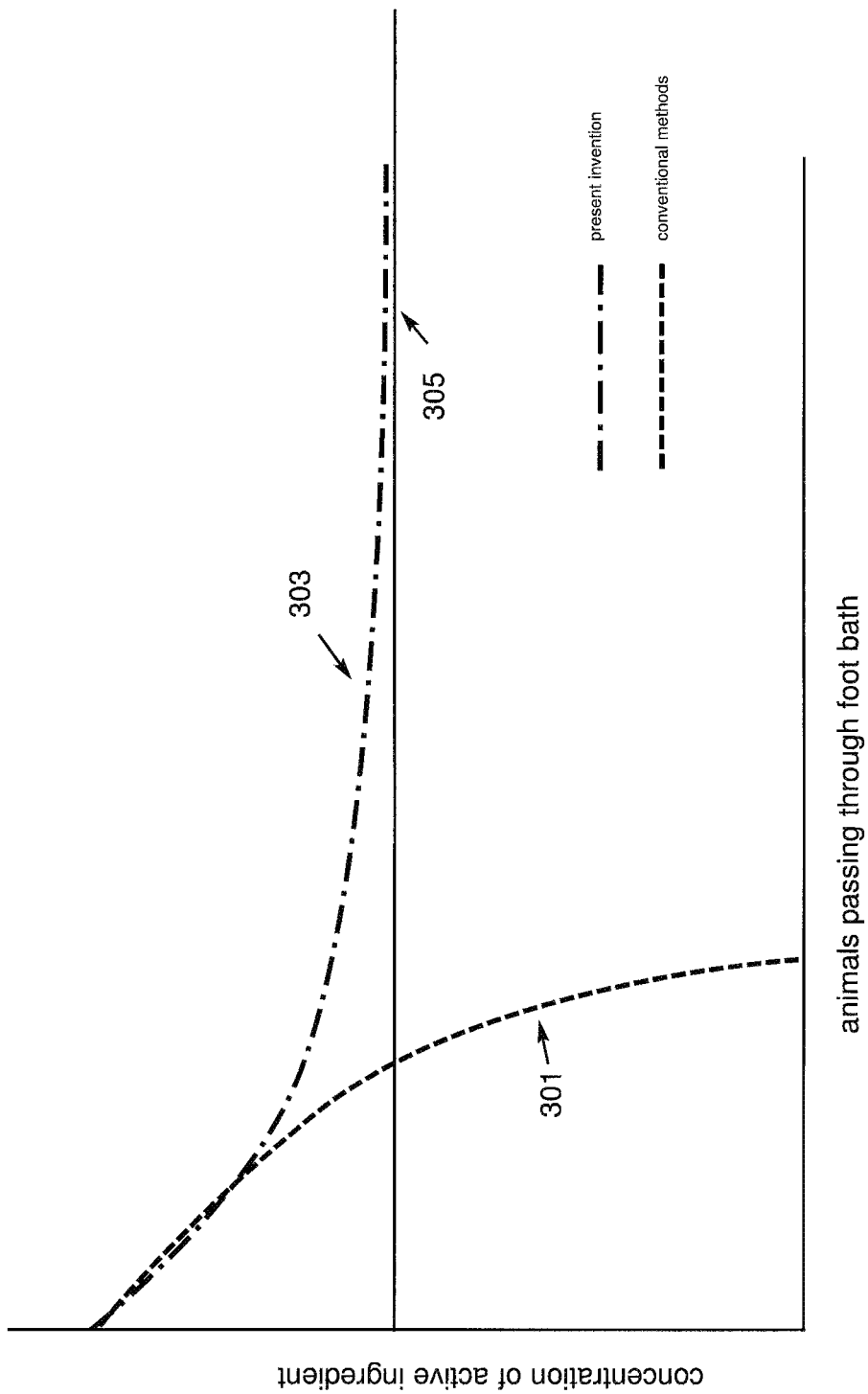
FIG. 3 illustrates a graph showing the comparison of a conventional apparatus being compared with the apparatus and method of the present invention and compares the concentration of active ingredient as the number of animals passing through the footbath increases.

A method and apparatus for maintaining the concentration of active ingredient in a footbath such that it deteriorates at a declining rate. The result of this declining rate when viewed as a graph as shown in FIG. 3 below is an asymptotic curve i.e. although the concentration of the active ingredient in the bath continues to decline, the rate of decline approaches zero after a relatively short period of time corresponding to a relatively small number of animals passing through the foot bath. At that point the active ingredient in the footbath liquid is being removed and diluted by the passing animals at substantially the same rate at which it is being replenished. This is an advantage of the present invention. A self-regulated dispenser system that regulates the fluid level in a footbath without requiring the operation of any moving parts while the system is working. Once turned on, the system has no moving parts so there can be no malfunction of any component due to wear, abrasion, etc. The present invention may be controlled by a negative pressure build-up inside the system capable of withholding a tall column of liquid but without periodically releasing the excessive vacuum which might result in the excessive liquid being released.

> A self-regulated dispenser system that regulates the fluid level in a footbath without requiring the operation of any moving parts while the system is working. Once turned on, the system has no moving parts so there may be no malfunction of any component due to wear, abrasion, etc. being controlled by a negative pressure build-up inside the system capable of withholding a tall column of liquid but without periodically releasing excessive vacuum which might result in excessive liquid being released.

The following test method is used to assess the rate at which the concentration of active ingredient in a footbath solution will deteriorate by the removal of said active ingredient by animals traversing the bath and by the concurrent dilution of the active ingredient by these animals as they deposit urine and other waste material during their passage.

This information is required to design the formula used for preparing footbath solution that is stored in hollow container 101.

Test Method

Purpose:

The test is designed to assess the amount of liquid removed from a footbath by dairy cows passing through it and to simultaneously assess the amount of liquid added in the form of urine and manure as cows pass through the bath. The purpose of these assessments is to gauge how much liquid must be added by a liquid replenishment system in order to maintain the depth of the bath at its starting point and to determine the required concentration of the new product.

Assumptions:

It is assumed that in all cases animals remove more liquid than they add. This assumption is borne out by hundreds of observations on dairies throughout the United States in which every single instance bears this out. It is also widely accepted that footbath levels go down as cows pass through rather than staying level or increasing.

It is also assumed that cows do not add measurable levels of copper sulfate to the bath in urine or manure.

Approach:

The overall approach is to make a footbath with copper sulfate and water and take a sample of this bath to measure initial concentration of copper ion in the water. The bath is aggressively acidified to ensure that the copper stays in solution throughout the entire procedure. Then a known volume of copper-free water (2 gallons) is added to dilute the bath by a known amount. Another sample is then taken and the new concentration is measured. Simple arithmetic is used to calculate original volume and concentration using the three known values for first concentration, second concentration and added copper-free water (2 gallons).

A Hach DR 2000 Spectrophotometer or similar instrument or a copper colorimeter is used to determine the above concentrations after diluting the sample to bring it into a range that the instrument can read.

After the above samples are taken and set aside for measurement, cows are allowed to pass through the footbath in the normal way. After a known number of cows have passed (usually the first one or two groups), the above procedure is followed again to take and measure two new samples, the first before dilution, the second after the standard 2 gallon dilution.

Sampling Method

When the bath is ready for samples to be taken the following procedure is used:

First the bath is agitated by walking around and swishing it back and forth with rubber boots on. Then 21 random samples are taken from throughout the bath in different places and at different depths and mixed together in a clean plastic container. The samples are taken using plastic squeeze bottles.

A bottle is inverted into the bath, squeezed, and then released and allowed to suck up a sample of fluid and particulate material from the bath. The resultant sample is then added to the clean container and the same squeeze bottle is used for all 21 sub-samples. These samples are thoroughly mixed and the squeeze bottle is filled from the resultant mix. This becomes sample number one and is set aside for later analysis. Any remaining mix is returned to the bath.

Then two gallons of water are added and the above sampling procedure is again followed. Water is added from a used water jug which had previously been purchased at a grocery store. Although this is a somewhat imprecise way to measure 2 gallons, repeat measurements have shown it to be no more than 0.22% off (about 10 ml) and since this is being added to a volume of about 50 gallons or more the % error will not be more than 0.0045%.

Math used:

$C_1$=first concentration $C_2$=second concentration

Q=total quantity of copper sulfate in solution in whole bath

V=Initial volume of water in bath in gallons

A=added volume of water in gallons (=2)

The following math is applied:

$Q/V=C_1$ $Q/(V+A)=C_2$ or, substituting known value for A, $Q/(V+2)=C_2$

Therefore: $Q=VC_1$ and $Q=VC_2+2C_2$ subtracting $0=(VC_1-VC_2)-2C_2$ or $0=V(C_1-C_2)-2C_2$ or $V(C_1-C_2)=2C_2$ Therefore: $V=2C_2/(C_1-C_2)$ The original volume is therefore calculated by substituting the measured values for concentration before and after dilution for $C_1$ and $C_2$ and solving for V.

The original quantity of copper sulfate used was $Q=VC_1$. As V and $C_1$ are both now known, Q is solved.

Finally, having determined Q and V for clean bath and soiled bath it can be determined how much Q has been removed by the cows one way or another (by splashing and by chemical reaction with hoof keratin) the average amount removed per cow is determined by subtraction. Also the degree of fluid loss is similarly determined. Using the original concentration $C_2$ it is determined how much fluid loss would have occurred had there been no addition by the cows. By subtracting this theoretical number for fluid loss (based on loss of copper) from the measured fluid loss we get the amount of fluid added by the cows.

FIG. 3 illustrates a graph showing the comparison of a conventional apparatus being compared with the apparatus and method of the present invention.

FIG. 3 illustrates that the concentration 301 of active ingredient falls off at an increasing rate with a batch-made footbath. The concentration rapidly approaches zero as the number of animals passing through the footbath increases without the bath being drained and replaced with fresh solution.

In contrast, FIG. 3 illustrates the concentration 303 of active ingredient decreases at a progressively lower rate and approaches a predetermined level of concentration 305 which can be adjustable by the user. Thus, the present invention has a declining rate of deterioration which eventually levels out so that no more deterioration can occur. The concentration 303 remains positive regardless of the number of animals which passed through the footbath.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

What is claimed is:

1. A method of self regulating a footbath for animals, comprising:

providing a container configured to hold fluid and a partial vacuum, when fluid and partial vacuum are in the container the fluid provides a source of fluid for addition to the footbath and the partial vacuum regulates the release of fluid from the container into the footbath, when fluid is in the container an upper surface of the fluid in the container defines a fluid line;

providing an air return passageway having first and second ends, the first end connecting to the container above the fluid line, the air return passageway is configured to extend to at least one of partially in the footbath or at least an upper surface of the footbath such that the second end is configured to be in contact with the upper surface of fluid when the fluid is at a predetermined height in the footbath, when the upper surface of the fluid in the footbath is below the predetermined height ambient air, from outside the container, enters the container by entering the second end of the air return passageway, travelling through the air return passageway, and entering the container from the first end of the air return passageway, at least a portion of the air return passageway being configured to hold a volume of fluid therein, the air return passageway being configured such that fluid cannot flow from the container through the air return passageway and to the hoofbath, wherein the container and air return passageway are configured such that when fluid and the partial vacuum are present in the container the air return passageway in combination with the container combine to regulate a level of fluid within the footbath automatically without using any pump or mechanical device to drive the fluid, when the fluid level in the footbath is lower than the second end of the air return passageway then air is drawn through the air return passageway and into the container which results in fluid being dispensed from the container to the footbath.

2. The method of claim 1, wherein the step of providing the air return passageway further comprises the at least a portion of the air return passageway is oriented generally vertically and extends to a height above the fluid line in the container.

3. The method of claim 1, further comprising the steps of: providing the footbath; and
providing fluid located in the container and the footbath; the partial vacuum in the container; wherein the fluid in the air return passageway is driven from the footbath into the air return passageway until a force at the second end of the air return passageway of the combination of the partial vacuum and the weight of the volume of fluid is equal to atmospheric pressure.

4. The method of claim 3, wherein the step of providing the fluid further comprises the fluid comprising a liquid having a treatment agent for animals feet and the self regulated feeder further comprises a flush passageway.

5. The method of claim 1, wherein the step of providing an air return passageway further comprises the air return passageway having a liquid trap device to prevent fluid from the footbath from reaching the container.

6. The method of claim 1, further comprising the step of providing an outlet passageway connected to the container and configured to channel fluid from the container to the footbath.

7. The method of claim 1, further comprising providing a check valve positioned between the container and the footbath to prevent fluid from flowing from the footbath into the container.

8. The method of claim 1, wherein the step of providing the air return passageway further comprises the air return passageway comprising a differential valve.

9. The method of claim 1, wherein the step of providing the container further comprises the container being a rigid walled container.

10. The method of claim 1, wherein the step of providing the air return passageway further comprises the footbath receiving fluid from the container periodically in response to a lower level of the liquid of the footbath.

11. The method of claim 10, wherein the step of providing the air return passageway further comprises the releasing of fluid from the container being controlled by a negative pressure build-up inside the container relative to atmospheric pressure.

12. The method of claim 1, further comprising the steps of: providing the footbath; and
providing the fluid, wherein the fluid in the footbath includes an active ingredient with a progressively decreasing rate of deterioration.

13. A method of self regulating a footbath for cattle, comprising:
providing a footbath configured for cattle to walk through;
providing a container enclosing fluid and a partial vacuum, an upper surface of the fluid in the container defining a fluid line, the fluid having treatment agents therein to treat hooves of the cattle, the fluid being located in the container and in the footbath, the fluid in the container provides a source of the fluid for addition to the footbath while the partial vacuum in the container regulates the release of the fluid from the container into the footbath;
providing an air return passageway having first and second ends, the first end connecting to the container above the fluid line, the air return passageway is configured to extend to at least one of partially in the footbath or at least an upper surface of the footbath such that the second end is configured to be in contact with the upper surface of the fluid when the fluid is at a predetermined height in the footbath, when the upper surface of the fluid in the footbath is below the predetermined height ambient air, from outside the container, enters the container by entering the second end of the air return passageway, travelling through the air return passageway, and entering the container from the first end of the air return passageway, at least a portion of the air return passageway being configured to hold a volume of fluid therein, the air return passageway being configured such that fluid cannot flow from the container through the air return passageway and to the hoofbath, the container and air return passageway combine to regulate a level of fluid within the footbath automatically without requiring any pump or mechanical device to drive the fluid, when the fluid level in the footbath is lower than the second end of the air return passageway then air is drawn through the air return passageway and into the container which results in the fluid being dispensed from the container to the footbath.

14. The method of claim 13, further comprising providing a check valve positioned between the container and the footbath to prevent fluid from flowing from the footbath into the container.

15. The method of claim 13, wherein the step of providing the air return passageway further comprises fluid in the air return passageway being driven from the footbath into the air return passageway until the force at the second end of the air return passageway of the combination of the partial vacuum and the weight of the volume of fluid is equal to atmospheric pressure.

16. A method of regulating a footbath for animals, comprising:
providing a footbath configured for animals to walk through;
providing a container enclosing fluid and a partial vacuum, an upper surface of the fluid in the container defining a fluid line, the fluid having treatment agents therein to treat feet of the animals, the fluid being located in the container and in the footbath, the fluid in the container provides a source of the fluid for addition to the footbath while the partial vacuum in the container regulates the release of the fluid from the container into the footbath;

providing an air return passageway having first and second ends, the first end connecting to the container above the fluid line, the air return passageway is configured to extend to at least one of partially in the footbath or at least an upper surface of the footbath such that the second end is configured to be in contact with the upper surface of the fluid when the fluid is at a predetermined height in the footbath, when the upper surface of the fluid in the footbath is below the predetermined height ambient air returns to the container via the air return passageway, the container and air return passageway are configured such that the air return passageway in combination with the container combine to regulate a level of fluid within the footbath automatically without requiring any pump or mechanical device to drive the fluid, when the fluid level in the footbath is lower than the second end of the air return passageway then ambient air is drawn through the second end of the air return passageway, travels through the air return passageway, and exits from the first end of the air return passagway into the container which results in the fluid being dispensed from the container to the footbath.

17. The method of claim 16, further comprising providing a check valve positioned between the container and the footbath to prevent fluid from flowing from the footbath into the container.

18. The method of claim 16, wherein the step of providing the air return passageway further comprises fluid in the air return passageway being driven from the footbath into the air return passageway until the force at the second end of the air return passageway of the combination of the partial vacuum and the weight of the volume of fluid is equal to atmospheric pressure.

19. The method of claim 16, wherein the step of providing the air return passageway further comprises continually driving the fluid so as to bring the fluid in the footbath back to the predetermined height.

20. The method of claim 16, wherein the step of providing the air return passageway further comprises continually driving the fluid so as to bring the fluid in the footbath back to the predetermined height without a concentration of the treatment agents in the footbath going below a predetermined concentration.

21. A method of self regulating a feeder for a footbath for animals, comprising:
providing a container configured to hold fluid and a partial vacuum, when fluid and partial vacuum are in the container the fluid provides a source of fluid for addition to the footbath and the partial vacuum regulates the release of fluid from the container into the footbath, when fluid is in the container an upper surface of the fluid in the container defines a fluid line;
providing an air return passageway having first and second ends, the first end connecting to the container above the fluid line, the air return passageway is configured to extend to at least one of partially in the footbath or at least an upper surface of the footbath such that the second end is configured to be in contact with the upper surface of fluid when the fluid is at a predetermined height in the footbath, when the upper surface of the fluid in the footbath is below the predetermined height ambient air returns to the container via the air return passageway, at least a portion of the air return passageway being configured to hold a volume of fluid therein, the air return passageway being configured such that fluid cannot flow from the container through the air return passageway and to the hoofbath, wherein ambient air can only enter the container by entering the second end of the air return passageway, travelling through the air return passageway, and exiting the air return passageway to enter the container, the container and air return passageway are configured such that when fluid and the partial vacuum are present in the container the air return passageway in combination with the container combine to regulate a level of fluid within the footbath automatically without using any pump or mechanical device to drive the fluid, when the fluid level in the footbath is lower than the second end of the air return passageway then air is drawn through the air return passageway and into the container which results in fluid being dispensed from the container to the footbath.

22. A method of regulating a footbath for animals, comprising:
providing a container configured to hold fluid and a partial vacuum, when fluid and partial vacuum are in the container the fluid provides a source of fluid for addition to the footbath and the partial vacuum regulates the release of fluid from the container into the footbath, when fluid is in the container an upper surface of the fluid in the container defines a fluid line;
providing an air return passageway having first and second ends, the first end connecting to the container above the fluid line, the air return passageway is configured to extend to at least one of partially in the footbath or at least an upper surface of the footbath such that the second end is configured to be in contact with the upper surface of fluid when the fluid is at a predetermined height in the footbath, when the upper surface of the fluid in the footbath is below the predetermined height ambient air returns to the container via the air return passageway, at least a portion of the air return passageway being configured to hold a volume of fluid therein, the air return passageway being configured such that fluid cannot flow from the container through the air return passageway and to the hoofbath, the container and air return passageway are configured such that when fluid and the partial vacuum are present in the container the air return passageway in combination with the container combine to regulate a level of fluid within the footbath, using the fluid in the container, automatically without using any pump or mechanical device to drive the fluid, wherein the fluid dispensed from the container to the hoofbath follows a path, at least a portion of the path being below the second end of the air return passageway prior to dispensing the fluid into the footbath, when the fluid level in the footbath is lower than the second end of the air return passageway then air is drawn through the air return passageway and into the container which results in fluid being dispensed from the container to the footbath.

23. A method of self regulating a feeder for a footbath for animals, comprising:
providing a container configured to hold fluid and a partial vacuum, when fluid and partial vacuum are in the container the fluid provides a source of fluid for addition to the footbath and the partial vacuum regulates the release of fluid from the container into the footbath, when fluid is in the container an upper surface of the fluid in the container defines a fluid line;

providing an air return passageway having first and second ends, the first end connecting to the container above the fluid line, the air return passageway is configured to extend to at least one of partially in the footbath or at least an upper surface of the footbath such that the second end is configured to be in contact with the upper surface of fluid when the fluid is at a predetermined height in the footbath, when the upper surface of the fluid in the footbath is below the predetermined height ambient air returns to the container via the air return passageway, at least a portion of the air return passageway being configured to hold a volume of fluid therein, the air return passageway being configured such that fluid cannot flow from the container through the air return passageway and to the hoofbath, the container and air return passageway are configured such that when fluid and the partial vacuum are present in the container the air return passageway in combination with the container combine to regulate a level of fluid within the footbath automatically without using any pump or mechanical device to drive the fluid, when the fluid level in the footbath is lower than the second end of the air return passageway then air is drawn through the air return passageway and into the container which results in fluid being dispensed generally simultaneously from the container to the footbath and from the air return passageway to the footbath, the fluid dispensed from the air return passageway having previously entered the air return passageway from the footbath.

\* \* \* \* \*